United States Patent [19]

Clark et al.

[11] Patent Number: 4,893,913
[45] Date of Patent: Jan. 16, 1990

[54] STEROMICROSCOPE HAVING STABILIZER FOR PREVENTING TIPPING OF EYEPIECE ASSEMBLIES

[75] Inventors: James A. Clark, Honeoye Falls; Henry J. Emmel, Rochester, both of N.Y.

[73] Assignee: Cambridge Instruments Inc., Buffalo, N.Y.

[21] Appl. No.: 28,858

[22] Filed: Mar. 23, 1987

[51] Int. Cl.[4] ............................................. G02B 21/22
[52] U.S. Cl. ..................................... 350/515; 350/516
[58] Field of Search .............. 350/515, 516, 511, 512, 350/513, 514, 517, 545, 549, 550, 551, 553, 145, 146, 130, 139

[56] References Cited

FOREIGN PATENT DOCUMENTS 2622743 11/1977 Fed. Rep. of Germany ...... 350/516

OTHER PUBLICATIONS

Jena Review, No. 4, 1969, pp. 238-241.

Primary Examiner—John K. Corbin
Assistant Examiner—Ronald M. Kachmarik
Attorney, Agent, or Firm—Alan H. Spencer

[57] ABSTRACT

A stereo vision optical instrument having eyepieces which are rotatably mounted to the instrument by way of pivot plates includes apparatus coupled between the pivot plates to prevent binding of the eyepieces as they are rotated.

4 Claims, 5 Drawing Sheets

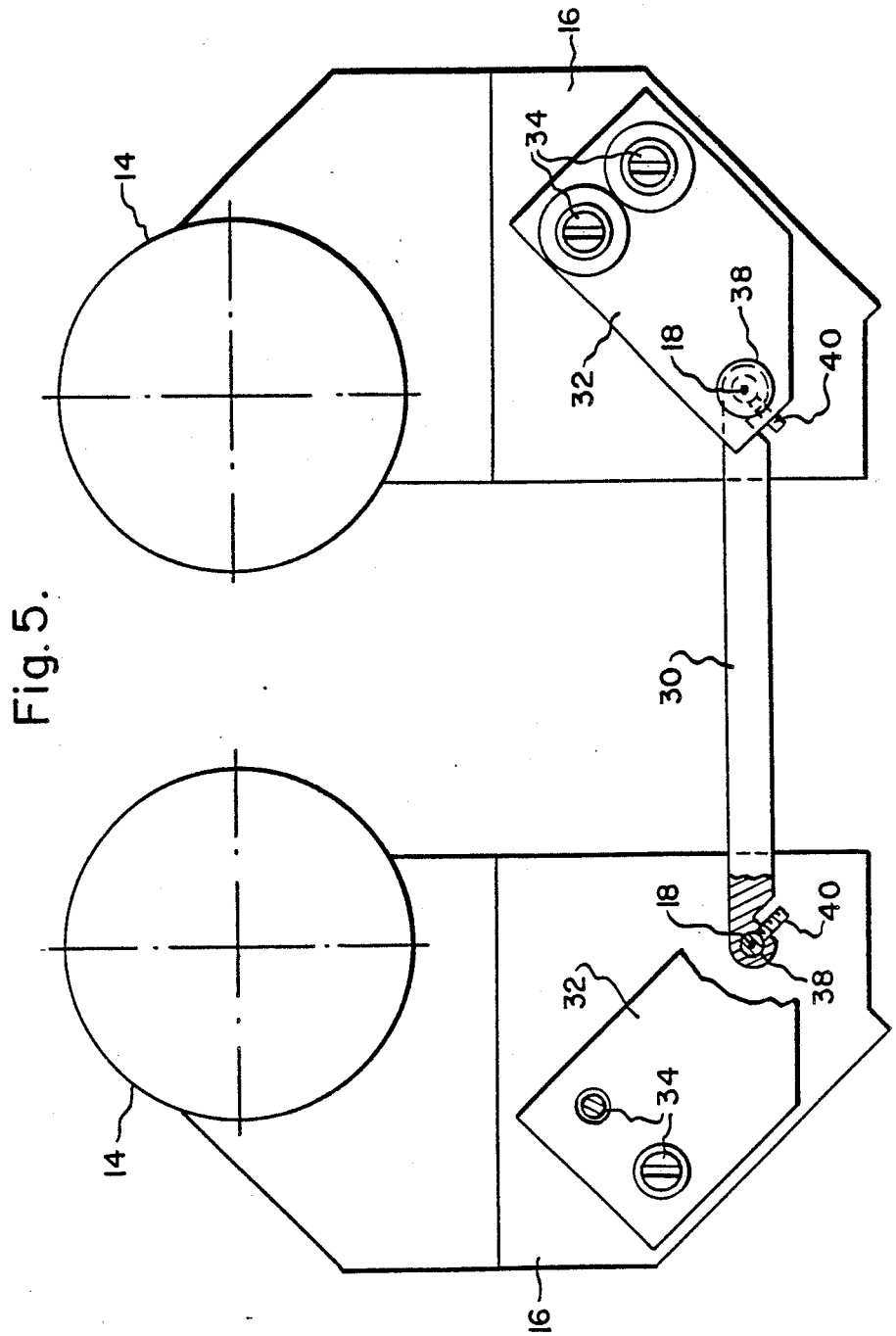

STEREOMICROSCOPE HAVING STABILIZER FOR PREVENTING TIPPING OF EYEPIECE ASSEMBLIES

BACKGROUND OF THE INVENTION

This invention relates to optical instruments, such as stereomicroscopes, having dual eyepiece assemblies, and more particularly stereomicroscopes having eyepiece assemblies which are rotatable to accommodate for variations in the distances between different operator's eyes.

Presently, there are several different stereomicroscopes available. In one type of microscope, for instance, the eyepieces are tilted with respect to the optical axes of the zoom lenses. This is done primarily for the comfort of the operator. In most such stereomicroscopes, the eyepiece assemblies are secured to plates which are spring loaded to the chassis of the microscope. The springs are adjustable, within certain parameters to prevent tipping of the eyepieces and to accommodate for the amount of force that is desired to rotate the eyepiece assemblies. Normally, the force required is less than one 1 b. Because the eyepieces are tilted, they project angularly away from the microscope body and from the zoom optical axes about which they rotate. Thus, a lever arm of substantial length is created. The length of the lever arm, which equals the distance between a point on the eyepiece near the cup and the center of the zoom optical axis about which the eyepiece rotates, is sufficient to overcome any opposing forces caused by the spring loading, etc. which may cause binding.

In a second type of stereomicroscope, such as is used by the electronics industry, it is oftentimes desirable to dispose the eyepieces so that they are parallel to the optical axes of the instrument. The rationale for such an arrangement is that the entire microscope is mounted at an angle to another instrument. The angle of mounting would cause the tipped eyepieces of the previously described microscope to project at an awkward and uncomfortable angle. Thus, a straight or parallel mount is required.

Normally, in instruments which are specifically designed for mounting to another instrument, the design of the optics and mechanics are worked out simultaneously. Accordingly, there is a cohesive interaction of all parts.

However, it is quite costly for a manufacturer to design and build separate microscopes for each specific task. Therefore, many advantages may be gained if one basic microscope could be designed which, with certain modifications, could be readily adapted to be used either as a stand alone instrument (with inclined eyepieces) or in conjunction with additional apparatus (with straight through eyepieces).

Accordingly, it is an object of the present invention to provide a stereomicroscope which may be utilized for various and diverse microscopic tasks.

Other objects and advantages of the invention will become apparent from the following description.

SUMMARY OF THE INVENTION

In accordance with the present invention, a stereomicroscope is provided which has rotatable eyepiece assemblies whose axes are offset from, but parallel to, the optical axes of the instrument. A stabilizer bar is connected between the pivot plates to which the eyepiece assemblies are mounted which acts to prevent the eyepiece assemblies from tipping upon rotation.

BRIEF DESCRIPTION OF THE DRAWINGS

FIG. 5 is a partial top plan view of the stereomicroscope shown in FIG. 4.

DETAILED DESCRIPTION OF THE PREFERRED EMBODIMENT

Figure 1:
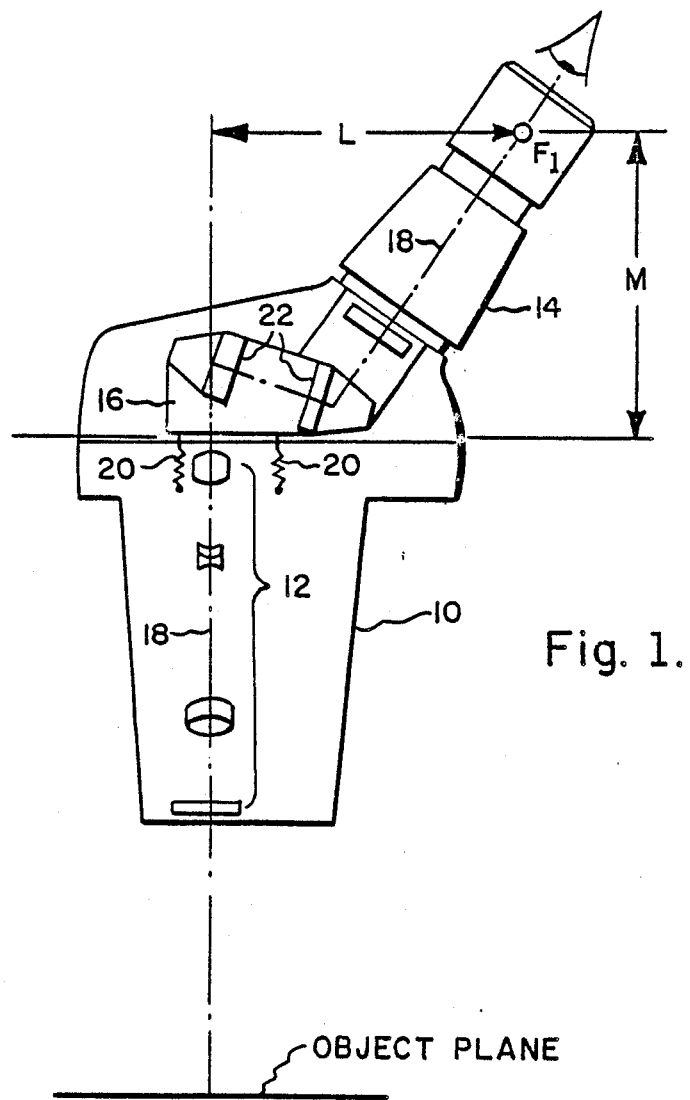
FIG. 1 is a schematic side view of a stereomicroscope having inclined eyepieces.

A stereomicroscope having inclined eyepieces such as is sold by Bausch & Lomb Incorporated and referred to as the "STEREOZOOM ® VI" stereomicroscope is shown schematically in FIG. 1. Briefly, it comprises a housing 10 to which the zoom optics 12 are mounted. The eyepiece assemblies 14 are secured to a pair of plates 16 (one of which is shown) which are, in turn, rotatably secured to housing 10 so as to be pivotable about optical axis 18. The plates 16 are spring loaded to the housing 10 by spring members 20 which are adjustable to accommodate for the amount of torque required to rotate the assemblies 14. Plates 16 further include mirror assemblies 22 mounted thereto.

Figure 2:
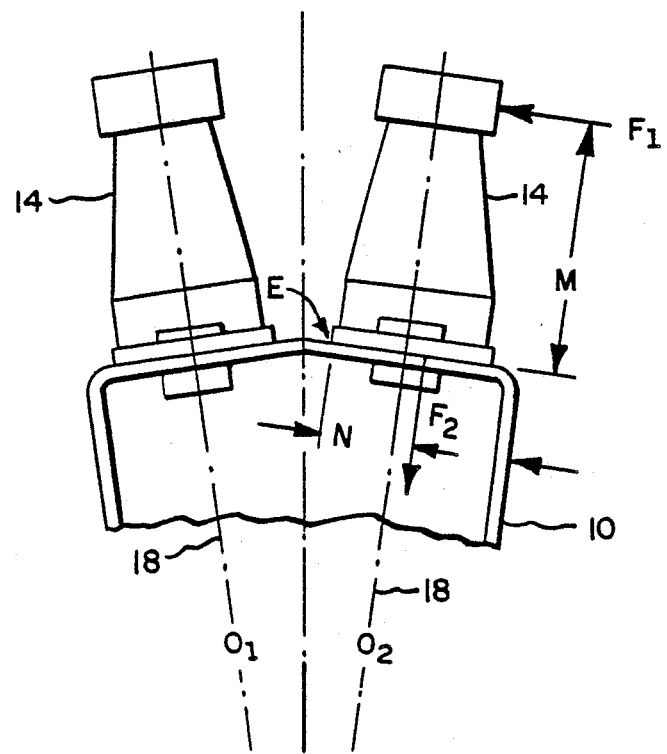
FIG. 2 is a schematic partial front view of the stereomicroscope shown in FIG. 1.

In order to change the interpupillary distance (I.P.D.) between the eyepieces 14, a force "$F_1$" is exerted on each of the eyepieces in order to move them either closer together or farther away from one another. With reference to FIG. 2, a "closing" force is illustrated. It will be seen from FIG. 1 that the distance from the optical axis 18, about which plates 16 rotate, to the point where the force "$F_1$" is applied to eyepieces 14 represents the length of a lever arm "L". The force $F_2$ exerted by spring members 20 is sufficient to bias the pivot plates 16 against the housing 10 and thus to hold the eyepiece assemblies 14 in a fixed position. Accordingly, the force "$F_1$" exerted against the eyepieces 14 must be sufficient to overcome the torque exerted on the pivot plates 16. Therefore, the following equation is applied (Where R=mean radius from axis 18 at which spring force $F_2$ is applied and f=coefficient of friction of materials of plates 16 and housing 10):

$$F_1 L > f F_2 R$$

However, in order to prevent tipping of the eyepiece about its edge E, without unduly increasing the force exerted on the pivot plates 16 by spring members 20, (as best seen in FIG. 2) the moment $F_1 M$ (where M=the distance between where $F_1$ is applied and the plane about which the pivot plates 16 rotate) must be less than the moment $F_2 N$ (where N=distance between where the $F_2$ component force is applied and the edge E). Accordingly, the following equation is applied:

$$F_1 M < F_2 N$$

It is evident that as the length of the lever arm "L" becomes longer, the force "$F_1$" required to rotate the eyepiece becomes smaller. However, in every instance the moment $F_1 M$ must remain less than $F_2 N$.

To produce the least tipping tendency of eyepieces 14, the length of the lever arm "L" and the value of force "$F_2$" should both be large while the value of "M" should be small. This is the condition in typical microscopes having tipped eyepieces, such as the previously referenced Bausch & Lomb "STEREOZOOM® VI" stereomicroscope.

The following Table is evidence of this:

TABLE I

| (Tipped Eyepiece Stereomicroscope - FIGS. 1 & 2) | | |
|---|---|---|
| $F_1$ | = | 454 gm |
| f | = | .3 |
| R | = | 15 mm |
| N | = | 10 mm |
| L | = | 80 mm |
| M | = | 70 mm |
| Solving for: $F_1$L | = | $fF_2$R |
| 454 gm × 80 mm | = | .3 × $F_2$ × 15 mm |
| $F_2$ | = | 8071 gm |
| Solving for: $F_1$M | < | $F_2$N |
| 454 gm × 70 mm | < | $^28071$ gm × 10/mm |
| 31,780 gm/mm | < | 80,710 gm/mm |

From the above it is observed that the rotation moment is less than the tipping moment and therefore the eyepieces are able to rotate about their axes.

Figure 4:
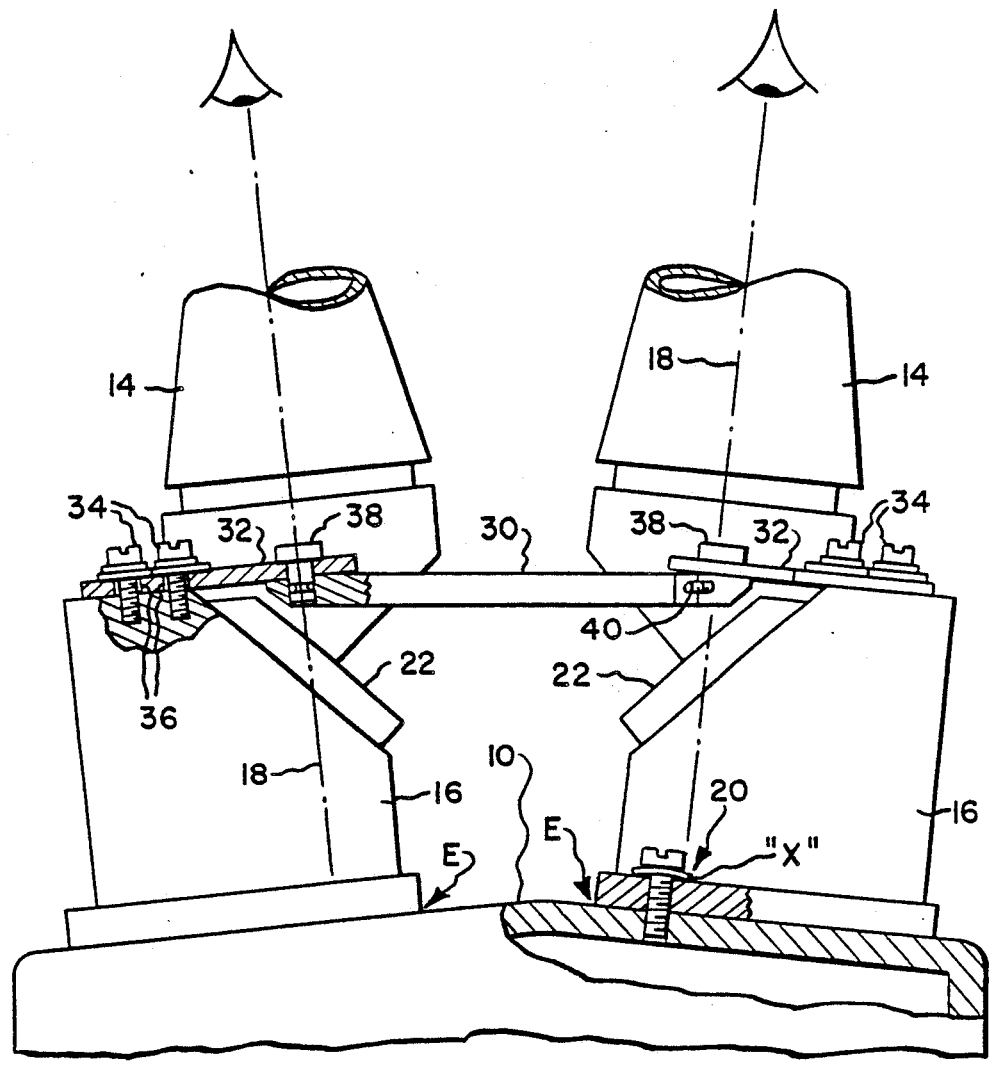
FIG. 4 is an enlarged partial front view of a stereomicroscope shown in FIG. 3 and including a stabilizer bar according to the present invention.

FIG. 4 illustrates a stereomicroscope having straight-through eyepieces and including a stabilizer bar according to the preferred embodiment of the present invention. Generally, as stated earlier, such microscopes are designed with a specific purpose in mind and the optics and mechanics are all worked out simultaneously. However, in an attempt to economize without sacrificing quality, Bausch & Lomb has taken the tipped eyepiece "STEREOZOOM® VI" and converted it for use as a straight-through eyepiece microscope. Basically, the housing 10, containing the zoom optics 12, remains exactly the same. The changes were in the pivot plates 16 to which the eyepieces and the mirror assemblies 22 mount. However, in effecting such changes to the microscope, an undesirable condition of eyepiece tipping and binding became evident, as shown on the following table:

TABLE 2

| (Straight-Through Eyepiece Microscope - FIGS. 3-5) | | | |
|---|---|---|---|
| $F_1$ | = | 454 gm | All FIGS. are exactly the same as in the tipped eyepiece microscope. These FIGS. change because of the repositioning of the eyepieces although the eyepieces are the same (See FIG. 3) |
| f | = | .3 | |
| R | = | 15 mm | |
| N | = | 10 mm | |
| L | = | 43 mm | |
| M | = | 102 mm | |
| Solving for: $F_1$L | = | $fF_2$R | |
| 454 gm × 43 mm | = | .3 × 15 mm | |
| $F_2$ | = | 4338 gm/mm | |
| Solving for: $F_1$M | < | $F_2$N | |
| 454 mm × 102 mm | < | 4338 × 10 | |
| 46,308 gm/mm | < | 43,380 gm/mm | |

From the above it is observed that the rotation moment exceeds the tipping moment. Therefore the eyepieces tend to tip about their edges and bind before rotation occurs. Without accommodation for this condition, the interpupillary distance (I.P.D.) cannot be adjusted.

Figure 3:
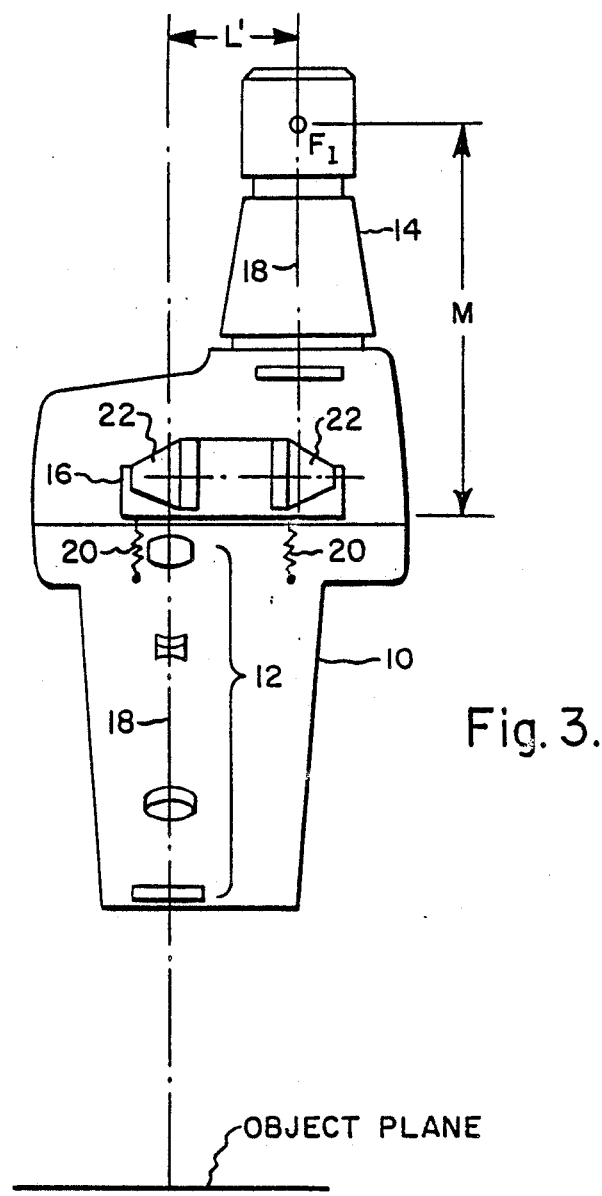
FIG. 3 is a schematic side view of the stereomicroscope of FIGS. 1 and 2, modified to incorporate straight-through eyepieces.

The straight-through eyepiece microscope shown in FIGS. 3–5 corrected the inherent problem.

We have determined that the tipping tendencies of eyepieces 14 can be accommodated for by mounting a stabilizer bar 30 between the pivot plates 16, as best illustrated in FIGS. 4 and 5. As described hereinabove, the pivot plates 16 are spring loaded to the housing 10 by way of spring members 20, which as indicated in FIG. 4, comprise a screw 31 and belleville spring 33.

It will be appreciated that the stabilizer bar 30 forms a mechanical link between the eyepieces 14 substantially above the pivot point about which they normally rotate. The stabilizer bar counteracts the tipping force which prevents the eyepieces 14 from tipping as a rotative force is applied. As they can no longer tip about their edges E, they are free to rotate about axis 18.

An anchor plate 32 is fixed to each pivot plate 16 by a pair of screws 34. Holes 36 in plate 32 through which screws 34 pass are slightly oversized to allow for slight adjustment of the anchor plates 32 on the pivot plates 16. The stabilizer bar 30 is pivotally secured to and between anchor plates 32 by way of pivot pins 38 which are secured to bar 30 by way of set screws 40.

Anchor plates 32 are adjustable to ensure that the pivot pins 38 connecting stabilizer bar 30 to the pivot plates 16 are substantially aligned with the optical axis 18 about which they must rotate.

The foregoing specification and drawings are merely illustrative of the invention, and are not intended to limit the invention to the disclosed embodiment. Variations and changes which are obvious to one skilled in the art are intended to be within the scope and nature of the invention which is defined in the appended claims.

We claim:

1. An optical instrument having stereo vision, comprising:
    a. a housing having supported therein a pair of optical systems each being aligned along a separate optical axis;
    b. a pair of pivot plates each being spring biased to said housing at a pivot point so as to be rotatable about one of said optical axes, each pivot plate having mounted thereto an eyepiece assembly having an optical axis offset from, but parallel to, one of said optical axes and a mirror assembly for directing light rays along said optical axes through said eyepiece assemblies; and
    c. link means spaced from said housing and coupling said pivot plates to prevent tipping of said pivot plates with respect to said housing as the eyepiece assemblies are rotated to thereby accommodate for variations in interpupillary distance.

2. The optical instrument as set forth in claim 1 wherein said means for preventing tipping comprises a stabilizer bar pivotally attached between said pivot plates.

3. The optical instrument as set forth in claim 2 wherein said stabilizer bar is mounted to said pivot plates above said mirror assemblies substantially in alignment with said optical axes.

4. The optical instrument as set forth in claim 2 or 3 further including means for adjusting the pivot points of said stabilizer bar.

* * * * *